United States Patent
Bailiang

(10) Patent No.: US 9,384,596 B2
(45) Date of Patent: *Jul. 5, 2016

(54) VISUALIZATION OF OBSCURED OBJECTS IN 3D SPACE

(71) Applicant: GOOGLE INC., Mountain View, CA (US)

(72) Inventor: Zhou Bailiang, Balgowlah (AU)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,213

(22) Filed: Sep. 11, 2015

(65) Prior Publication Data

US 2016/0005238 A1    Jan. 7, 2016

Related U.S. Application Data

(63) Continuation of application No. 13/671,001, filed on Nov. 7, 2012, now Pat. No. 9,135,743.

(51) Int. Cl.
| | |
|---|---|
| *G06T 17/05* | (2011.01) |
| *G06T 19/20* | (2011.01) |
| *G06T 15/10* | (2011.01) |
| *G06T 15/20* | (2011.01) |

(52) U.S. Cl.
CPC ............... *G06T 19/20* (2013.01); *G06T 15/10* (2013.01); *G06T 15/20* (2013.01); *G06T 17/05* (2013.01); *G06T 2210/04* (2013.01); *G06T 2219/004* (2013.01); *G06T 2219/2012* (2013.01); *G06T 2219/2024* (2013.01)

(58) Field of Classification Search
CPC ......... G06T 17/00; G06T 17/05; G06T 15/00; G06T 15/20
See application file for complete search history.

(56) References Cited

U.S. PATENT DOCUMENTS

| | | | |
|---|---|---|---|
| 9,135,743 | B2 | 9/2015 | Bailiang |
| 2002/0063705 | A1 | 5/2002 | Moriwaki et al. |
| 2003/0151592 | A1 | 8/2003 | Ritter |
| 2008/0180439 | A1 | 7/2008 | Adabala et al. |
| 2011/0001751 | A1 | 1/2011 | Carlsson et al. |

(Continued)

OTHER PUBLICATIONS

Rekimoto et al., "The Information Cube: Using Transparency in 3D Information Visualization," Department of Computing Science, University of Alberta Edmonton (1993).

Chittaro et al., "The Interactive 3D BreakAway Map: A navigation and examination aid for multi-floor 3D worlds," 2005, International Conference on Cyberworlds.

(Continued)

*Primary Examiner* — Ryan D McCulley
(74) *Attorney, Agent, or Firm* — Marshall, Gerstein & Borun LLP

(57) ABSTRACT

A system, method and software application implement a visualization scheme for presenting information in a 3D map. A set of rules specifies the visualization scheme, particularly with respect to how the system renders background objects that are obscured by a foreground object. The objects include elements such as building surfaces, streets, pointers, icons, labels, floor plans, and the like. The rules specify details such as stroke, fill, transparency, opacity, and visibility of the elements. Some of the rules may specify relationships between an object and elements that are considered "internal" to the object, while others of the rules may specify relationships between an object and other elements considered "external" to the object.

20 Claims, 18 Drawing Sheets

(56) References Cited

U.S. PATENT DOCUMENTS

| | | |
|---|---|---|
| 2011/0025531 A1 | 2/2011 | Geelen et al. |
| 2011/0140928 A1 | 6/2011 | Ren et al. |
| 2012/0297346 A1 | 11/2012 | Hoffknecht et al. |
| 2013/0222373 A1 | 8/2013 | Weinstein et al. |
| 2014/0013263 A1 | 1/2014 | Bailiang et al. |

OTHER PUBLICATIONS

Hagerdorn et al., "High-level web service for 3D building information visualization and analysis," 2007, Proceedings of the 15th annual ACM international symposium on Advances in geographic information systems.

Office Action issued in U.S. Appl. No. 13/671,001 dated Nov. 14, 2014.

VISUALIZATION OF OBSCURED OBJECTS IN 3D SPACE

CROSS-REFERENCE TO RELATED APPLICATIONS

This application is a continuation of and claims priority to U.S. application Ser. No. 13/671,001, filed on Nov. 7, 2012, entitled "Visualization of Obscured Objects in 3D Space," the entire disclosure of which is hereby expressly incorporated by reference herein.

FIELD OF THE DISCLOSURE

The present disclosure relates to displaying 3D spaces in a mapping application and, more particularly, to presentation schemes for displaying obscured objects in a 3D map display.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Advances in three-dimensional (3D) modeling—both in terms of the number of available software applications and the ease with which the available applications can be used— have facilitated the proliferation of 3D digital modeling through a number of technological areas. Using computer-aided drafting (CAD) programs, digital modeling software, and the like, professionals and novices alike can generate digital, 3D models of buildings, spaces, objects, etc. One context in which 3D modeling has found particular utility is the field of digital cartography (i.e., digital maps). One function of digital cartography is to generate maps that provide accurate visual depictions of an area. Mapping applications, such as those found on the Internet and on many mobile devices (e.g., car navigation systems, hand-held GPS units, mobile phones, portable and tablet computers, etc.), allow users to visualize an area in 3D, often including 3D models of buildings and other map features.

SUMMARY

One embodiment of the techniques discussed below is a method for depicting on a display a three-dimensional map. The method is executed by a computer processor executing instructions stored on a memory device. The method includes determining, using the processor, a foreground object in the 3D map, and determining, using the processor, one or more background objects in the 3D map. The background objects include at least (i) a map of the interior of the foreground object, (ii) an icon identifier within, behind, or beneath the foreground object, (iii) a label within, behind, or beneath the foreground object, (iv) a map of the interior of a building behind the foreground object, (v) an icon identifier within, behind, or beneath the background object, or (vi) a label within, behind, or beneath the background object. The method also includes applying with the processor a first rendering style to the foreground object. The rendering style includes a parameter specifying whether to include outline strokes depicting the outline of the foreground object; and a parameter specifying whether to include transparent or semi-transparent fill depicting surfaces of the object. The method further includes applying with the processor a second rendering style to the one or more background objects, the second rendering style different from the first rendering style, and generating in the processor a display of the 3D map including the foreground object rendered in the first rendering style and the one or more background objects rendered in the second rendering style.

Another embodiment of these techniques is a method for depicting on a display a three-dimensional map. The method is executed by a computer processor executing instructions stored on a memory device. The method includes receiving map data related to the 3D map and determining from the received data the layout of a scene depicted in the 3D map. The method also includes determining, from a plurality of elements in the 3D map, a foreground object and one or more background objects, each of which is at least partially obscured by the foreground object. Further, the method includes determining applicable rendering styles for each of the foreground object and the background objects and reading from the memory device the applicable rendering styles. The method also includes applying a first rendering style to the foreground object and applying one or more second rendering styles to the background objects, before generating a 3D map in which the plurality of elements including the foreground and background objects are rendered according to the applicable rendering styles.

According to yet another embodiment, a non-transitory computer-readable storage medium stores instructions that are executable by a processor to cause the processor to receive map data related to a 3D map and determine from the received data the visual relationships between a plurality of elements of a scene depicted in the 3D map. The instructions also cause the processor to determine from the plurality of elements in the 3D map a foreground building and one or more background objects, each of which is at least partially obscured by the foreground building and each of which is selected from streets, buildings, labels, icons, and floor plans. Further, the instructions cause the processor to determine applicable rendering styles for each of the foreground building and the background objects and to read from the storage medium the applicable rendering styles. Still further, the instructions cause the processor to apply a first rendering style to the foreground building and to apply one or more second rendering styles to the background objects, before generating a 3D map in which the plurality of elements including the foreground building and the background objects are rendered according to the applicable rendering styles.

DETAILED DESCRIPTION

Using the techniques described below, a software application implements a visualization scheme for presenting information in a 3D map. The software application implements a set of rules specifying the visualization scheme. Each of the rules relates to a visual element of the map, such as the stroke, fill, transparency, or opacity of a graphical element (e.g., of a building surface, a street, a pointer, an icon, a label, a pin etc.), and specifies a behavior of the graphical element depending on whether, in the 3D representation, the graphical element in question is obscured by a different element. For example, a rule may specify that a location pin and corresponding label for a point that is obscured by a 3D foreground building may be depicted in grey instead of black. At the same time, a rule may specify that the walls of the foreground building are semi-transparent, so that the location pin and corresponding label are visible, despite being obscured by the building. As another example, a rule may specify that the visible surfaces (i.e., those in the line of sight from the apparent viewpoint) of a 3D foreground building are transparent, indicated only by the strokes of the building outline, such that an indoor map of the building is visible. Another rule may specify that the obscured surfaces of the building (i.e., the surfaces that are not in the line of sight from the apparent viewpoint; the "back" surfaces) are opaque, such that a background building obscured by the foreground building is not visible through the foreground building.

The software application receives data of the 3D space depicted in the mapping application. As generally understood, the 3D space may be represented by data specifying a 3D mesh. Features of the 3D space, such as building surfaces and edges, streets, pointers, labels, and the like, may be specified in relation to the 3D mesh. To determine whether a feature is obscured, the software application determines a viewpoint from which the user has selected to view the scene, calculates the visual relationships between the features from the selected viewpoint, determines which features would be visible and/or obscured from the particular viewpoint, and applies the rules according to the determination of which features are visible and/or obscured. According to one example implementation, the software application applies the rules according to one or more selections by the user, including, for example one or more layers selected by the user for viewing.

Figure 1:
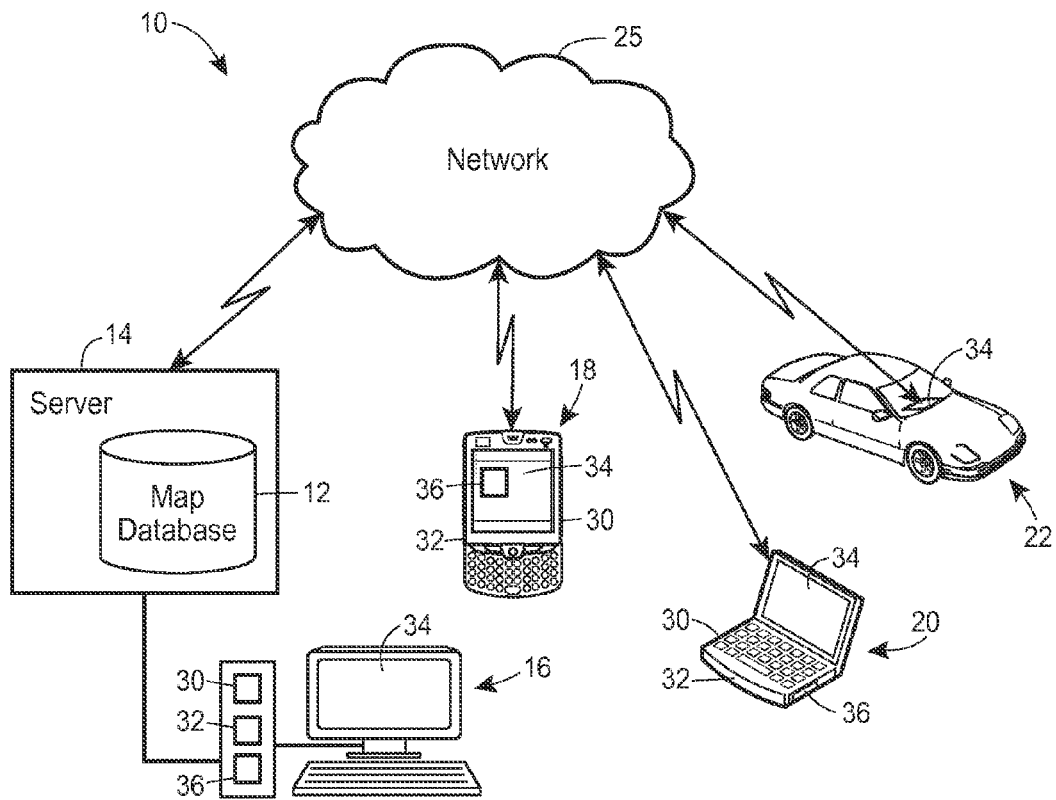
FIG. 1 is a block diagram of an example system for visualization of obscured objects in 3D space.

Referring now to FIG. 1, a map-related imaging system 10, according to an embodiment, includes a map database 12 stored in a server 14 or in multiple servers located at, for example, a central site or at various different spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless local area network (LAN), metropolitan area network (MAN) or wide area network (WAN), the Internet, or any combination thereof. The map client devices 16-22 may be, for example, mobile phone devices (18), computers such a laptop, tablet, desktop or other suitable types of computers (16, 20) or components of other imaging systems such as components of automobile navigation systems (22), etc. Moreover, the client devices 16-22 may be communicatively connected to the server 14 via any suitable communication system, such as any publically available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data (e.g., bitmaps) and vector image map data. However, the image rendering systems described herein may be best suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object to a user via one or more of the client devices 16-22. As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 operates such that a user, at one of the client devices 16-22, opens or executes a map application (not shown in FIG. 1) that operates to communicate with and obtain map information or map related data from the map database 12 via the server 14. The map application may then display or render a map image based on the received map data. The map application may allow the user to view different geographical portions of the map data stored in the map database 12, to zoom in on or zoom out of a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
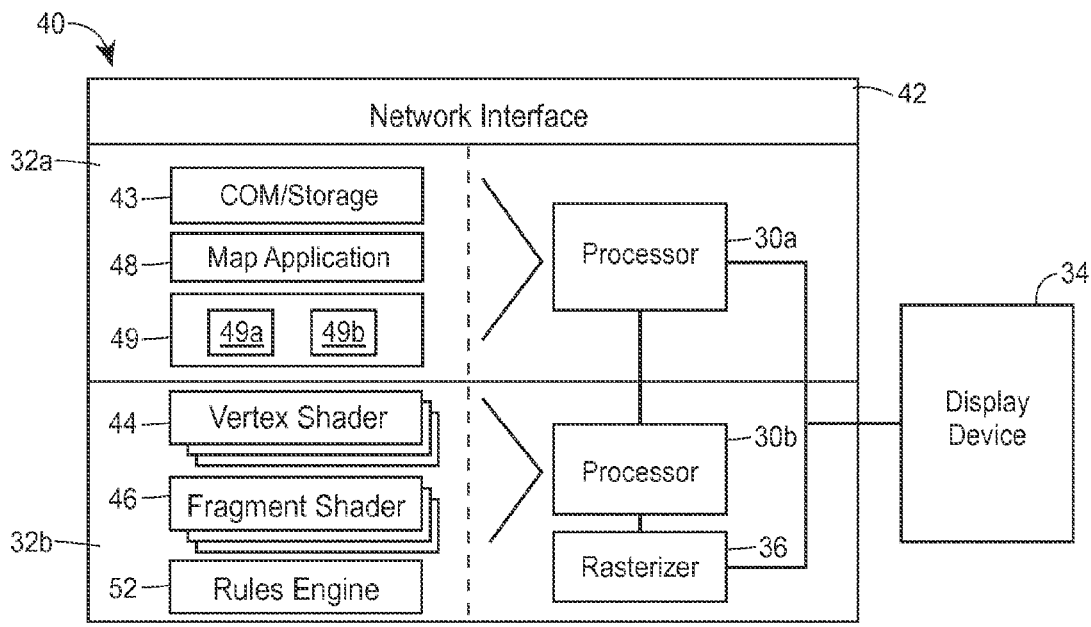
FIG. 2 is a block diagram of an image rendering device associated with the system of FIG. 1.

Referring now to FIG. 2, an image generation or imaging rendering device 40, according to an embodiment, associated with or implemented by one of the client devices 16-22 is illustrated in more detail. The image rendering system 40 of FIG. 2 includes two processors 30a and 30b, two memories 32a and 32b, a display device 34 and a rasterizer 36. In this case, the processor 30b, the memory 32b and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one more map applications 48 having map display logic therein stored on the memory 32a, which may be executed on the processor 30a (e.g., which may be a central processing unit (CPU)). Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders are executed on the processors 30a and 30b to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory for example, that stores vector data 49a received from the map database 12, the vector data 49a including any number of vertex data points and one or more lookup tables as will be described in more detail. The data memory 49 may also store one or more sets of rules 49b, which may be combined with one another to specify a visualization scheme for displaying the features in a three-dimensional map.

During operation, the map logic of the map application 48 executes on the processor 30 to determine the particular image data needed for display to a user via the display device 34 using, for example, user input, GPS signals, pre-stored logic or programming, etc. The display or map logic of the application 48 interacts with the map database 12, using the communications routine 43. The application communicates with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30a. In one embodiment, the image data sent from the server 14 includes vector data generally defining data for each of a set of vertices associated with a number of different image elements or image objects to be displayed on the screen 34 and possibly one or more lookup tables which will be described in more detail below. If desired, the lookup tables may be sent in, or may be decoded to be in, or may be generated by the map application 48 to be in the form of vector texture maps which are known types of data files typically defining a particular texture or color field (pixel values) to be displayed as part of an image created using vector graphics. More particularly, the vector data 49a for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables downloaded and stored in the data memory 43.

The processor 30b may also execute a rules engine 52 that operates as described in greater detail below to retrieve the rules 49b from the data memory 49, to evaluate the rules 49b, and to implement the visualization scheme specified by the rules 49b in cooperation with the rasterizer 36 and the vertex and fragment shaders 44 and 46, respectively.

The rules 49b may relate to any number of different features and combinations of features depicted in a displayed 3D map image, and may also relate to properties of the features and/or properties of the scene. For example, features that indicate a position in the 3D map, such as a pin, a dot, an icon, etc., and any associated (or stand-alone) labels may be depicted as internal or external to a building, and may be visible or obstructed by another feature of the 3D map, depending on the apparent viewpoint from which the 3D map is depicted. That is, a position-indicating pin could be on an un-obscured portion of a street, an obscured portion of a street, inside of a building, behind a building, inside of a background building that is obscured by a foreground building, etc.

Similarly, some 3D maps may include internal floor plans for one or more buildings depicted in the maps. The floor plans may be internal to visible buildings (i.e., un-obscured buildings), may be internal to buildings in the background (i.e., buildings obscured by other features of the map, such as another building) and, in some instances, may be outside of a building (e.g., such as a floor plan for an outdoor market). A floor plan for a building may indicate a layout of a ground floor of a building, or of an upper floor of a building, and may be irregularly shaped in some instances to reflect the shape of the building on the depicted floor.

Other map features, such as buildings (in whole or in part), walls of buildings, pathways and streets may also be visible or obscured. For example, a building in the foreground may obscure all or part of a building in the background. As another example, a building may obscure all or part of a street or other pathway.

Each of the various features of the 3D map may have one or more properties relating to the depiction of the feature on the 3D map. The properties for a feature may include one or more of visibility, opacity/transparency, stroke, and fill. Visibility is simply whether a feature is visible in a particular instance. For example, a pin and/or its corresponding may be visible or obscured, according to the set of rules 49b instantiated in a particular 3D map depiction. That is, a rule 49b may specify that pins that are not obscured will be displayed, while pins that are obscured by a foreground building will not be displayed (even if, for example, the foreground building is transparent). Likewise, a building (or portion of a building) may be visible when in the foreground but not visible if it is obscured by a building in the foreground, or a street may be visible when un-obscured by not visible if it is obscured. Still further, the fact that a building or street or label (or a portion of a building or street or label) is obscured by something in the relative foreground does not necessarily lead to its being rendered not visible. Various ones of the rules 49b, considered together, may result in a street that is visible through a transparent or outlined building in the foreground, or a building in the background that is visible through a transparent building in the foreground.

Transparency is another property that may be associated with various map features including, for example, floor plans, walls, and buildings. Transparency refers to the process of combining an image with a background to create the appearance of transparency. As will be understood, transparency is not a binary property, but rather a property having a spectrum of possible implementations. In various instances, a feature may be, for example, 0% transparent (i.e., opaque), 25% transparent, 50% transparent, 75% transparent, or 100% transparent (i.e., invisible). The rules 49b may specify in different circumstances, that features be wholly or partially transparent. The foreground wall (e.g., front wall) of a building in the foreground of a scene may be 95% transparent, while the obscured wall (e.g. back wall) of the same building may be 0% transparent, thus allowing the user viewing the 3D map to "see inside" the building, but not through the building to the scene behind it. That is, features (e.g., labels, pins, floor plans, etc.) inside of the building may be visible "through" the front wall of the building, while features obscured by the foreground building (e.g., other buildings, portions of other buildings, streets, etc.) may be obscured by the opaque back wall of the foreground building. In another example, a rule 49*b* may specify that all of the walls of a foreground building may be 50% transparent, allowing a user to visualize both features inside the foreground building and a building that is in the background and would otherwise be obscured by the foreground building. Another rule 49*b* may specify that all of the walls of the background building may be 0% transparent, such that internal features of the background building are not visible.

The properties of visibility and transparency can each apply to the stroke and/or the fill of a feature. The stroke of a feature is essentially the outline of the feature. For example, a building depicted in a 3D map may be depicted only in outline (i.e., with stroke, but no fill), only by shading its surfaces (i.e., with fill, but no stroke), or by both outlining the shape and shading its surfaces (i.e., with both stroke and fill). Fill and stroke may each be opaque, partially transparent, etc., lending to the overall appearance of the feature as appearing opaque, transparent, in outline, etc.

Figure 3:
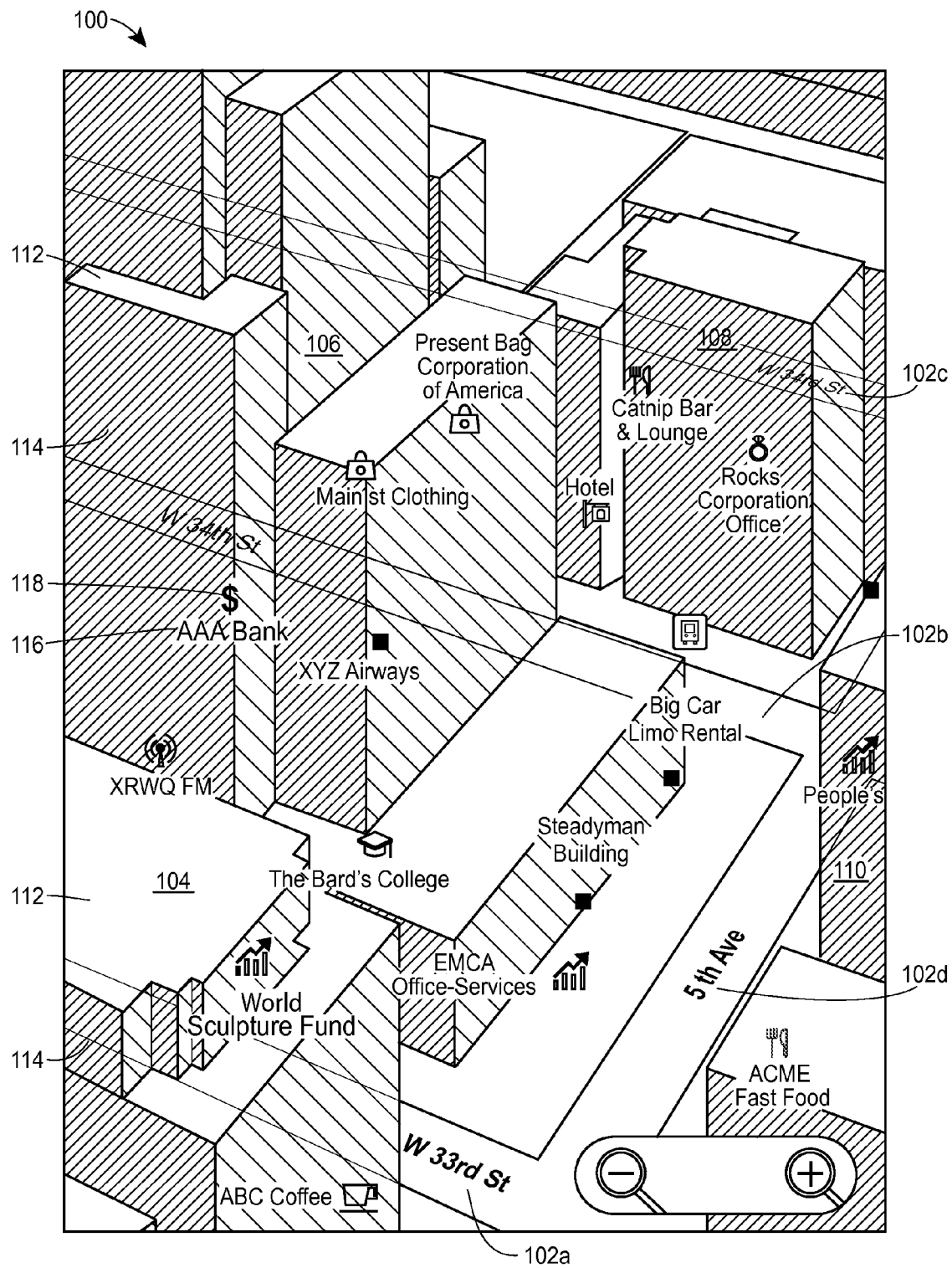
FIGS. 3-16 are exemplary 3D maps rendered by the system of FIG. 1 and illustrating a variety of implementations of the system.

FIGS. 3-16 illustrate the results of various combinations of rules 49*b* with respect to a depicted 3D map. FIG. 3 depicts a 3D map 100 that may result from the cooperation of the rules engine 52, the rasterizer 36, and/or the vertex and fragment shaders 44 and 46 to implement a visualization according to a first set of rules 49*b*. The rules 49*b* may specify, for example, that all building surfaces and outlines (fill and stroke) be semi-transparent, that all icons and labels are visible, and that all buildings are visible. In FIG. 3, three streets 102*a*, 102*b*, 102*c*, intersect with a fourth street 102*d*. Buildings 104, 106, 108, 110 appear in the map 100 as 3D models. Each of the buildings 104-110 is depicted with semi-transparent stroke and fill on all surfaces, such that objects behind a building remain visible. For example, the street 102*a* is visible "through" the building 104, the street 102*b* is visible through the building 106, the street 102*c* is visible through both the buildings 106 and 108, and the street 102*d* is visible through the building 110. Building surfaces that are parallel to the ground (i.e., those surfaces depicting building tops), such as the surfaces 112, are depicted in a lighter color fill than surfaces depicting the sides of the buildings, such as surfaces 114. Labels 116 and icons 118 are visible for business entities in the 3D map, but it is not possible in all instances to determine with which building the entity associated with a label and icon corresponds. For example, labels and icons indicate the locations for the World Sculpture Fund and ABC Coffee appear in the building 104. Labels and icons indicate the positions of AAA Bank, XYZ Airways, The Bard's College, XRWQ FM, and EMCA Office Services in the building 106, however, the labels and icons for Main St Clothing and Present Bag Corp of America could easily appear to the viewer as being in either the building 106 or the building 108. Additionally, with few exceptions, the user cannot determine whether the position of the labels 116 and icons 118 are indicative of the position of the entity projected to the ground or of the position of the entity on a non-ground floor of the building. For example, the label 116 and icon 118 for XYZ Airways could depict that the entity is on the ground floor of the building 106 along the street 102*b*, or could depict that the entity is on a non-ground floor of the building 106.

Figure 4:
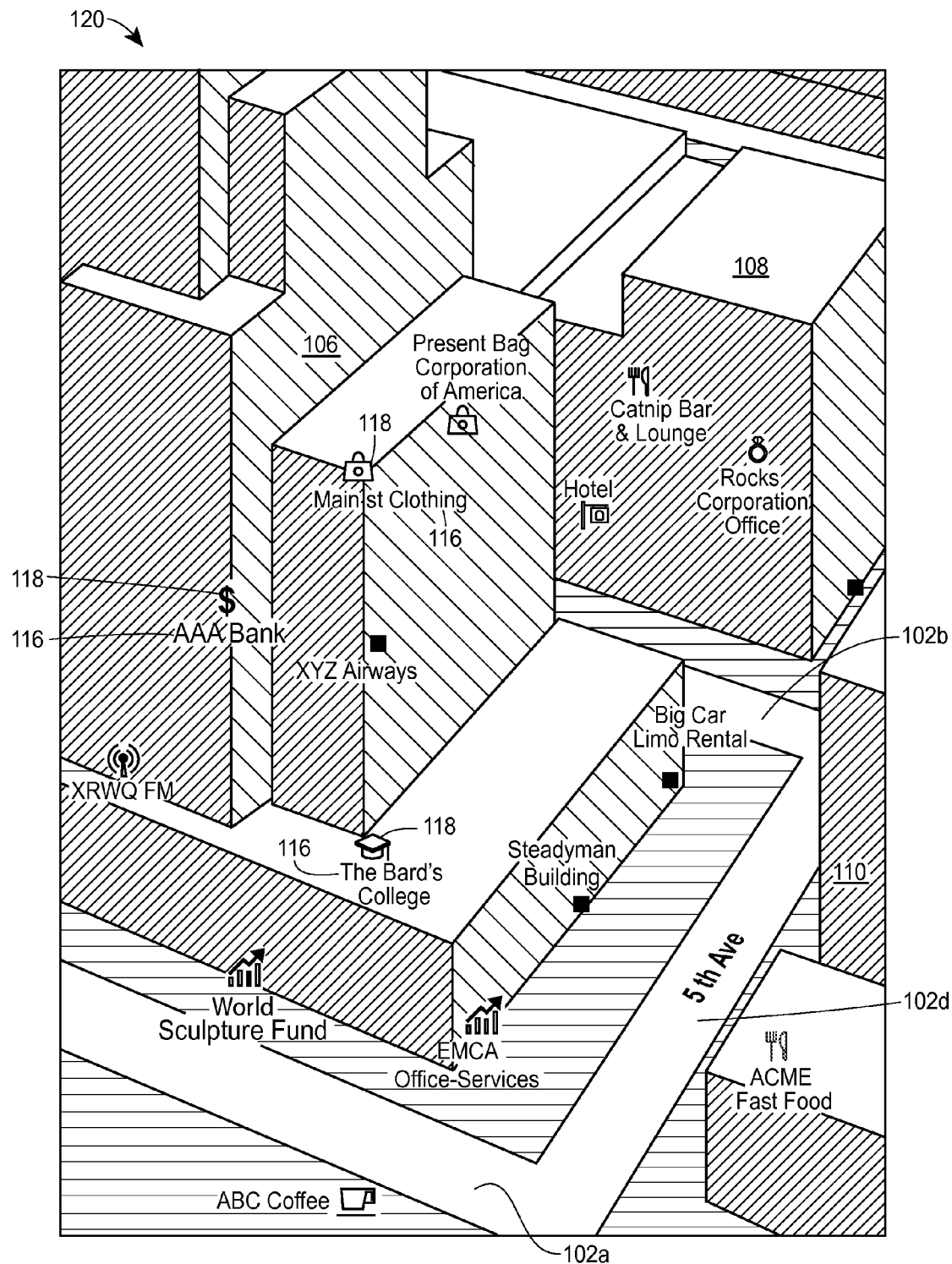

In some instances, it may be desirable to reduce visual clutter associated with transparent buildings. A rule 49*b* may, for example, specify that where no relevant information would be blocked by making the buildings 106, 108, 110 opaque, the buildings 106, 108, 110 should be rendered as opaque. FIG. 4 depicts a 3D map 120 depicting the same geographical region. In the FIG. 4, however, the stroke and fill of the depicted buildings 106, 108, 110 appear opaque (0% transparency). The building 104 is omitted entirely. This may result, for example, from a rule 49*b* specifying that buildings in the mid-ground (e.g., the building 106) of the 3D map 120 should not be obscured by buildings in the foreground (e.g., the building 104). The street 102*c* is no longer visible, as it is obscured by the building 108 and the street 102*b* is only partly visible. The labels 116 and icons 118 in FIG. 4 are still visible. FIG. 4 appears less visually cluttered than FIG. 3. However, the labels 116 and icons 118 for Main St Clothing and Present Bag Corp of America still appear to be in the building 106, and it remains unclear whether, for example, the label 116 and icon 118 for AAA Bank indicate that the entity is along the street 102*b* or on a non-ground floor of the building 106. The rules engine 52, the rasterizer 36, and/or the vertex and fragment shaders 44 and 46 may cooperate to implement the 3D map 120 according to a second set of rules 49*b*. The rules 49*b* may specify, for example, that all building surfaces and outlines (fill and stroke) be opaque, that all labels 116 and icons 118 are visible, and that buildings in the extreme foreground (i.e., the building 104) be omitted so they do not obscure buildings in the mid-ground and background (i.e., the buildings 106 and 108, respectively).

Figure 5:
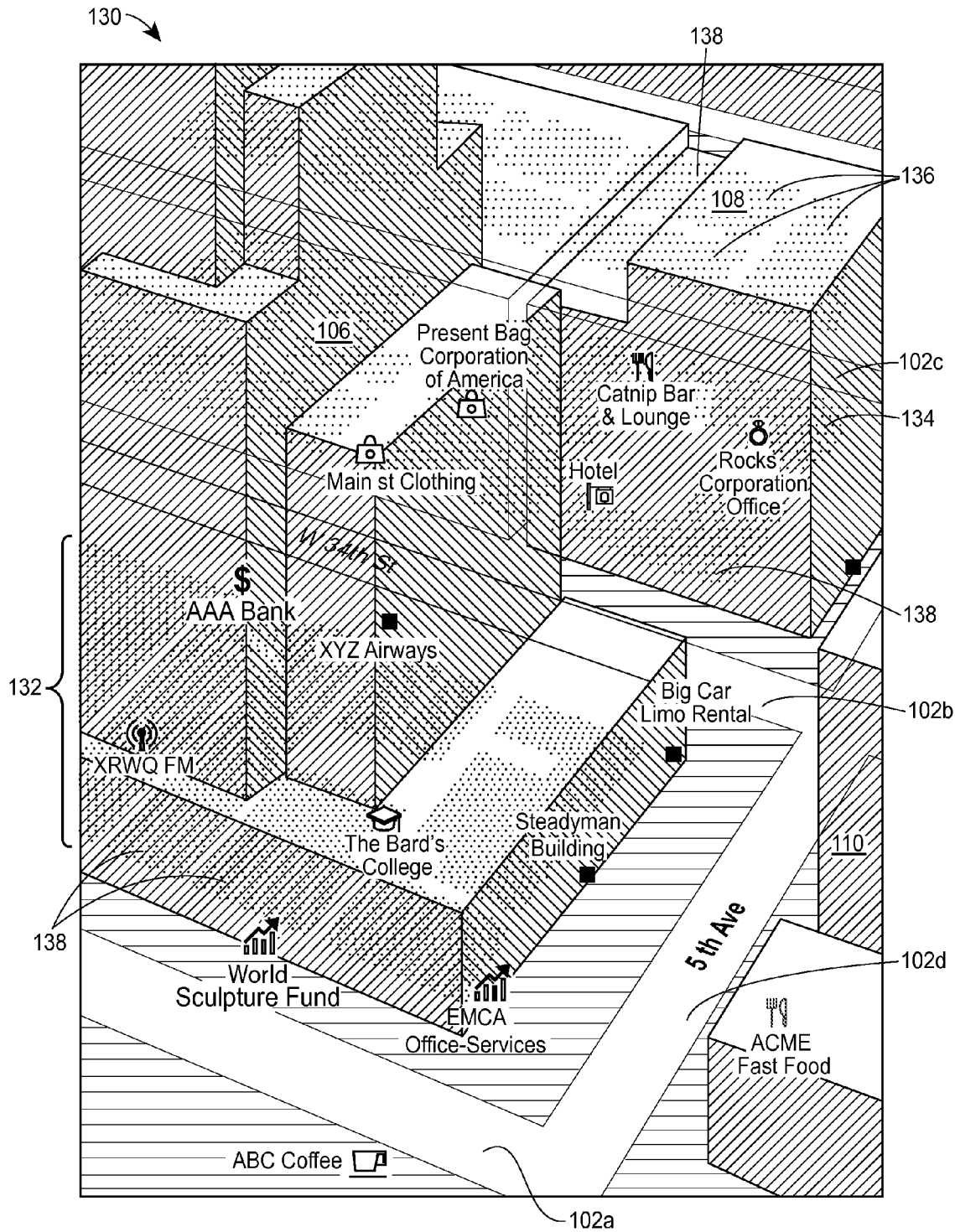

Yet another set of rules 49*b* may be interpreted and executed by the rules engine 52 in cooperation with the rasterizer 36, the vertex shaders 44 and the fragment shaders 46 to create a 3D map such as that depicted in FIG. 5. FIG. 5 depicts a 3D map 130 resulting from a set of rules 49*b* specifying that the stroke and fill of the buildings 106, 108, 110 are 50% transparent and internal floor plans 132 for each of the buildings 106, 108, 110 are displayed. The labels 116 and icons 118 remain visible. One of the rules 49*b* may specify, for example that where 25% or more of a building's footprint are depicted in the 3D map, an internal floor plan should be rendered for the building. Thus, in FIG. 5 a floor plan 132 is rendered for the building 106 and a floor plan 134 for the building 108, but no floor plan is rendered for the building 104. In FIG. 5, a floor plan 136 is rendered for a building behind the building 108, though the building behind the building 108 is not itself rendered. Each of the floor plans 132, 134, 136 is rendered as a series of darker filled areas 138, with no stroke (i.e., with no outline).

Figure 6:
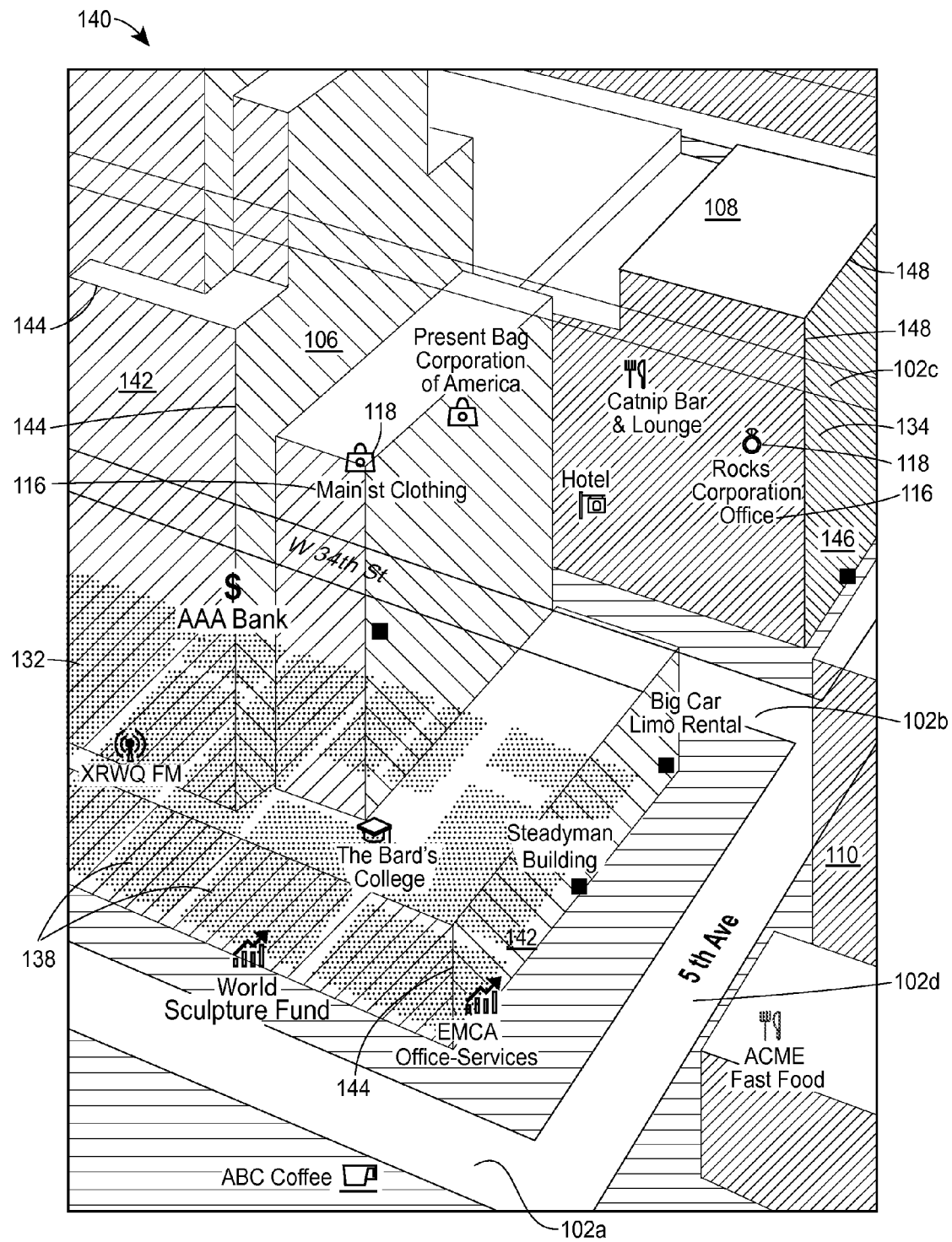

Still another set of rules 49*b* may result in the 3D map 140 depicted in FIG. 6. In the map 140, the building 104 is once again omitted, while the buildings 106, 108, 110 are rendered. However, unlike the map 130 depicted in FIG. 5, in the map 140 the floor plan 132 is rendered only for the building 106 at the focus of the map 140. Additionally, the building 106 for which the floor plan 132 is rendered is rendered with both fill 142 and stroke 144 80% transparent, adding to the visibility of the floor plan 132, which is again rendered as a series of darker filled areas 138 with no stroke. The fill 146 and stroke 148 of the building 108, by contrast, are rendered as only 20% transparent, and the building 108 is rendered without the floor plan 134. The streets 102*a*, 102*b*, 102*c*, and 102*d* all remain at least partially visible through the transparent buildings 106, 108, and 110.

Figure 7:
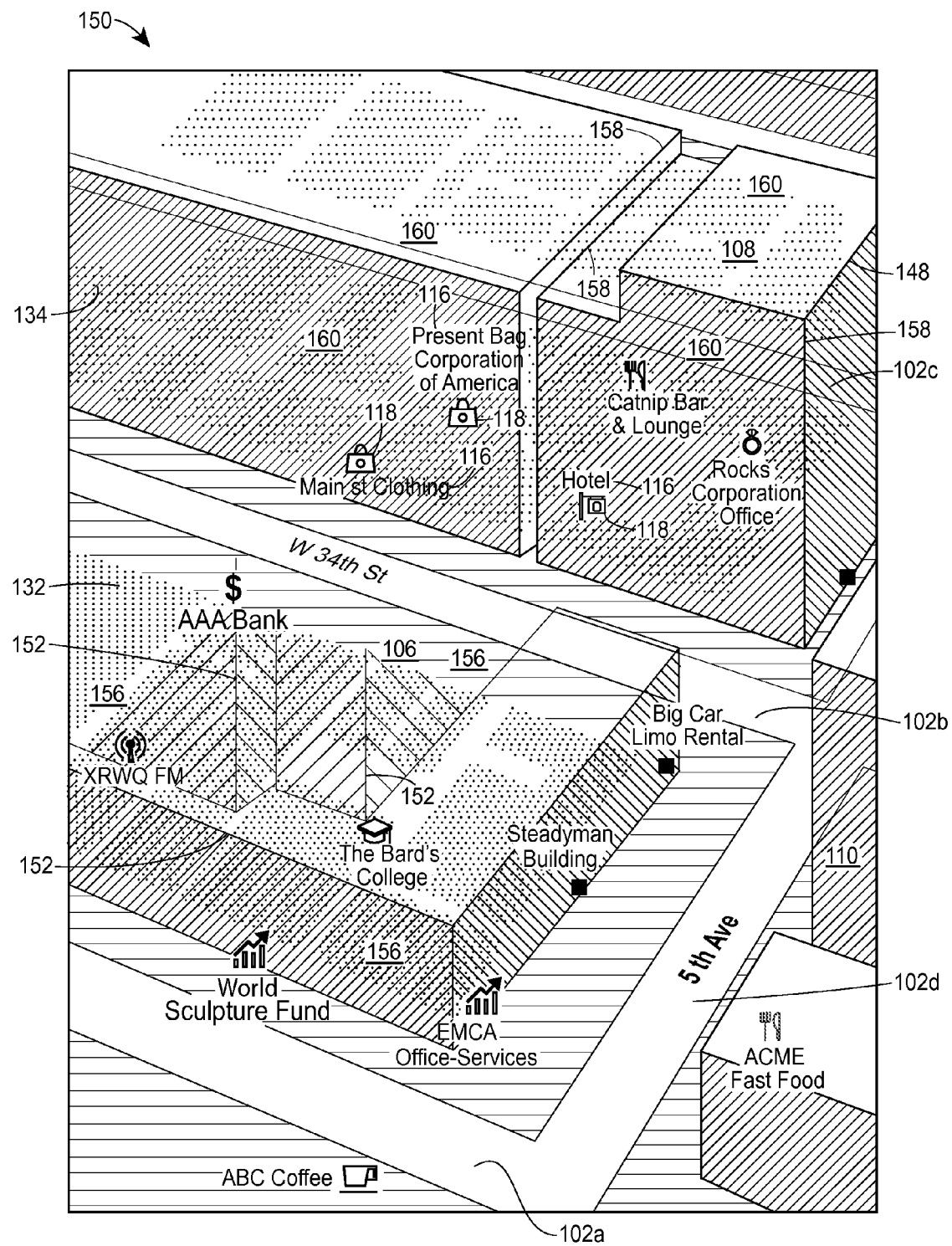

In FIG. 7, a 3D map 150 depicts the buildings 106, 108, and 110 with generally 50% transparency. However, a rule 49*b* specifies that the building 106 is rendered such that both stroke 152 and fill 154 of the building 106 fade as the stroke 152 and fill 154 move away from the street level of the 3D map 150. Thus, the stroke 152 and fill 154 of the building 106 are readily visible close to the street level 156, but fade away as they move up the image. The floor plans 132, 134, and 136 are rendered without stroke, as in FIGS. 5 and 6, though the floor plans 134 and 136 are partially obscured by stroke 158 and fill 160 of the building 108.

Figure 8:
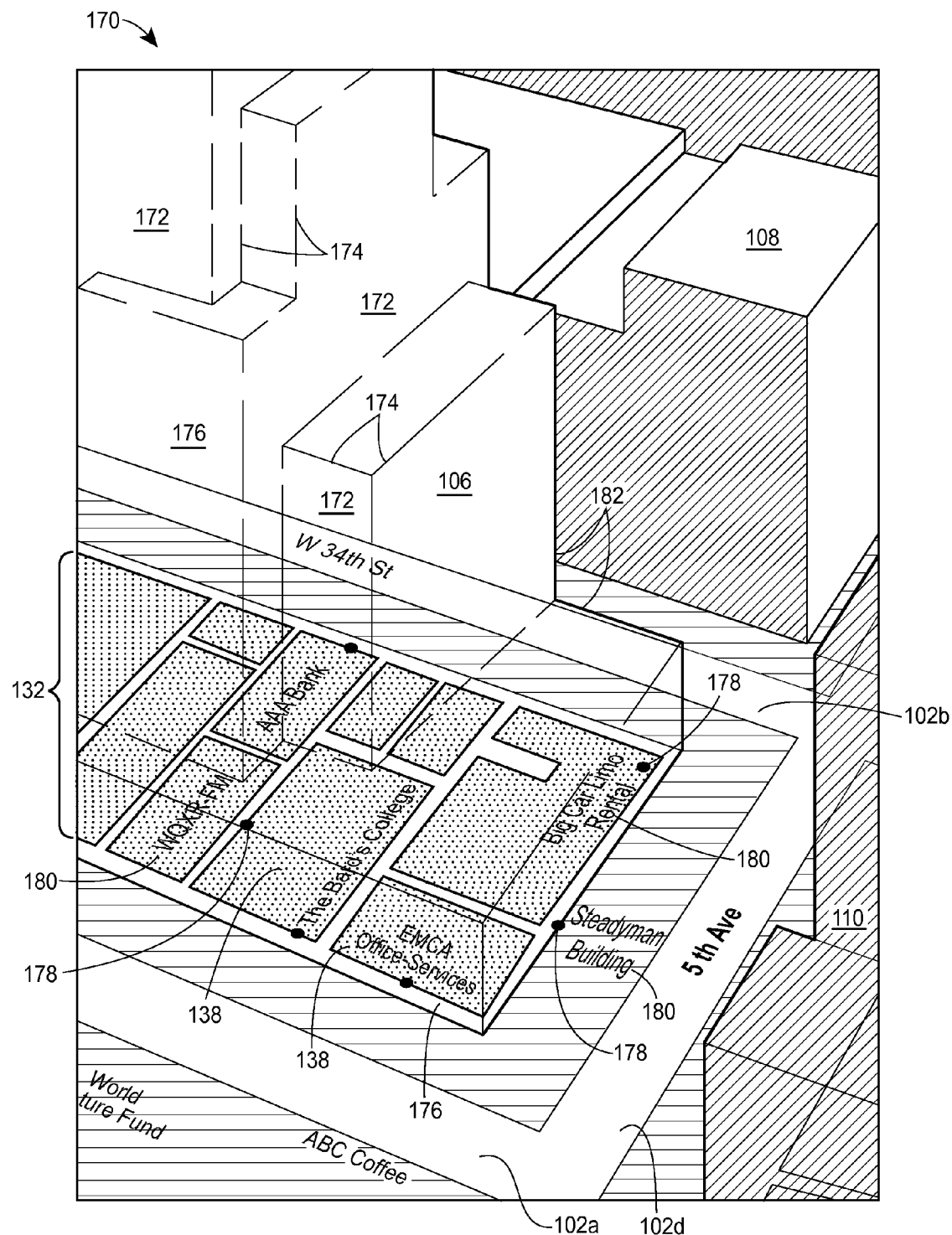

FIG. 8 depicts yet another example of a 3D map 170. The 3D map 170 is rendered according to a set of rules 49*b* that specify yet another rendering scheme. In the 3D map 170 The building 106 is rendered with transparent fill along its front-facing surfaces 172 and no stroke along its front-facing edges 174. This leaves the building 106 transparent for its indoor content, which includes the floor plan 132. The floor plan 132 is clearly visible. In the 3D map 170, however, the darker filled areas 138 are set on a lightened background 176, and are clearly outlined. Additionally, an entrance icon 178 denotes the entrance to each space of the floor plan 132, and a label 180 is clearly set in each of the areas 138 to denote the entity associated with the area 138 on the floor plan 132.

Meanwhile, the back of the building 106 is generally rendered as opaque, obscuring everything in the background except for the street 102*b*. The outline 182 of the back of the building 106 is rendered with full stroke. The building 108 in the background is rendered fully opaque where it is not obscured by the building 106, obscuring the floor plans 134 and 136.

Figure 9:
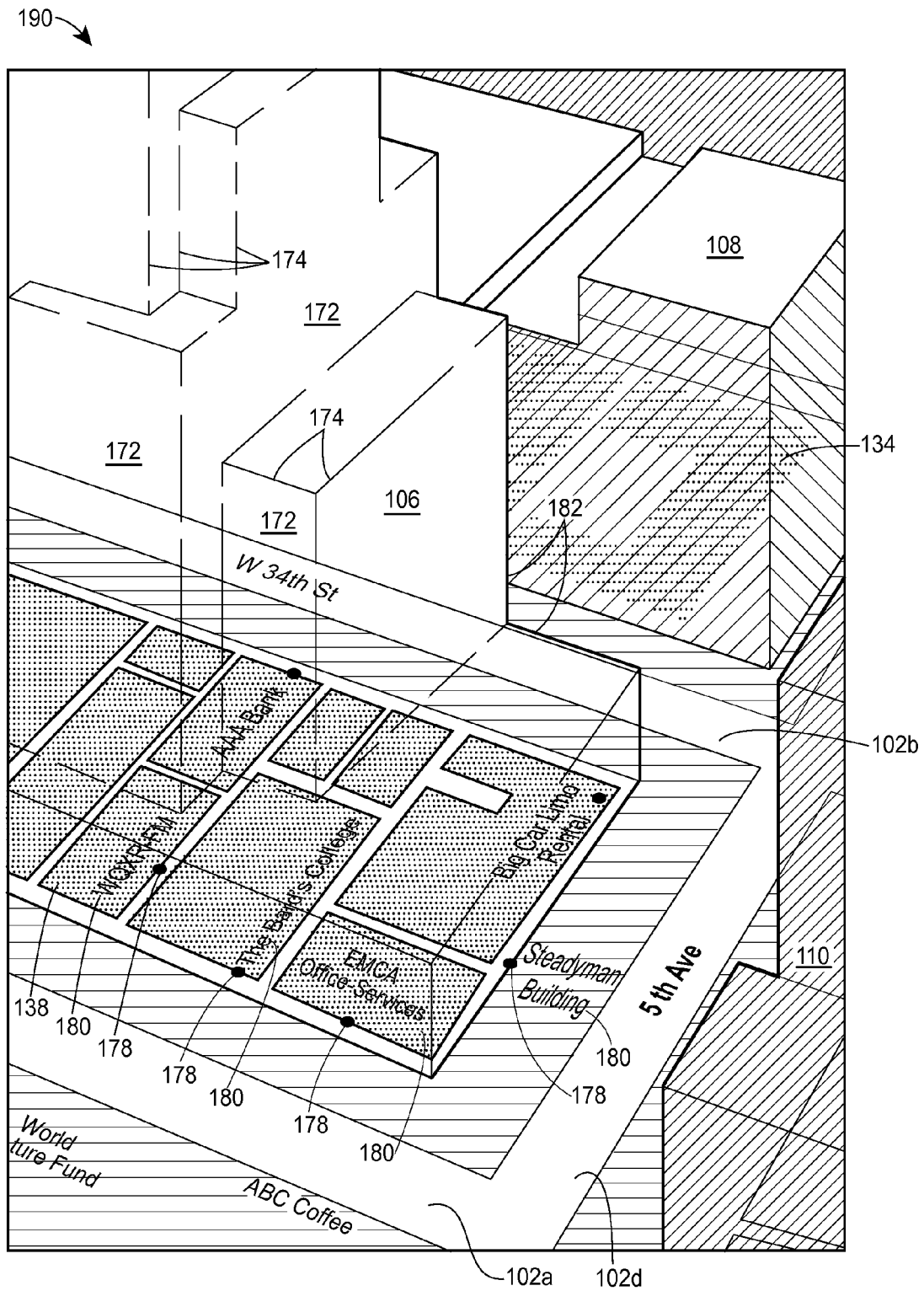

FIG. 9 depicts a 3D map 190 rendered almost identically to the 3D map 170 of FIG. 8. However, in the 3D map 190, a rule 49*b* specifies that the building 108 is not entirely opaque and, instead, the floor plan 134 is rendered as partially visible through within the building 108. The floor plan 134 is only visible in the building 108 where it is not obscured by the building 106.

Figure 10:
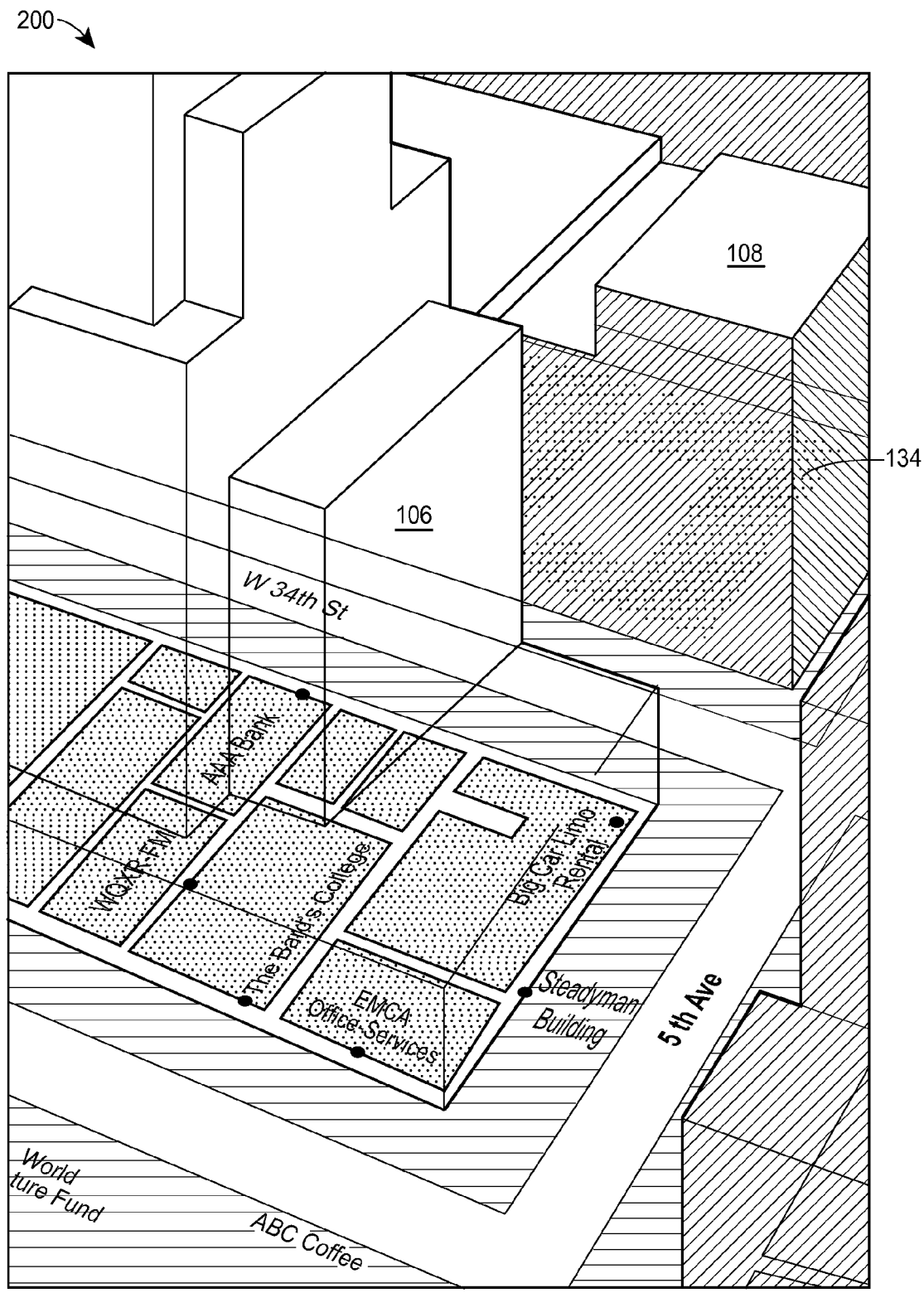

In FIG. 10, which depicts a 3D map 200 rendered almost identically to the 3D map 190 of FIG. 9, the building 106 is transparent to the street 102*b* and additionally to the building 108. However, the building 106 is not transparent to the floor plan 134, which means that the floor plan 134 is visible where it is not obscured by the building 104, but not visible where it is obscured by the building 104.

Figure 11:
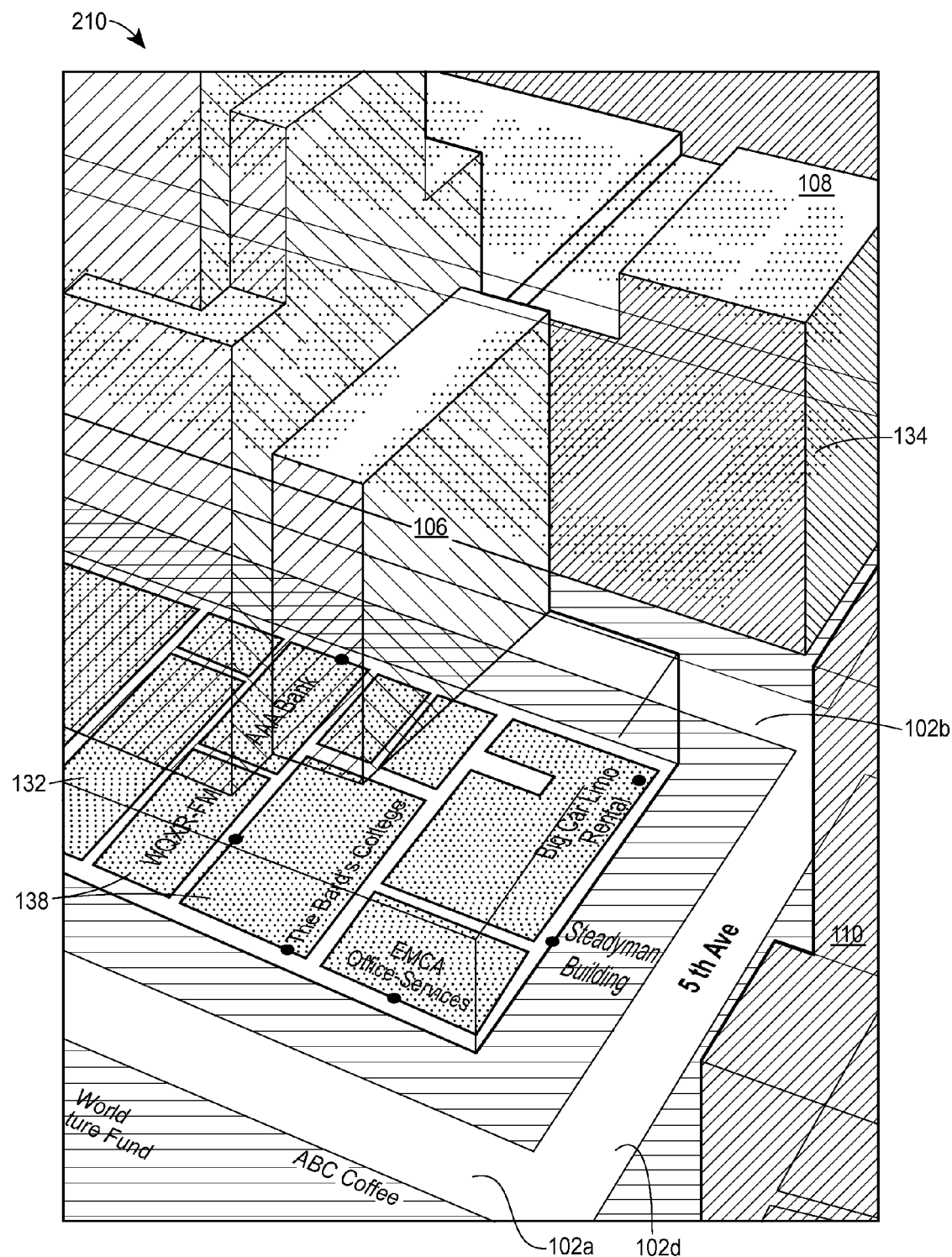
Figure 12:
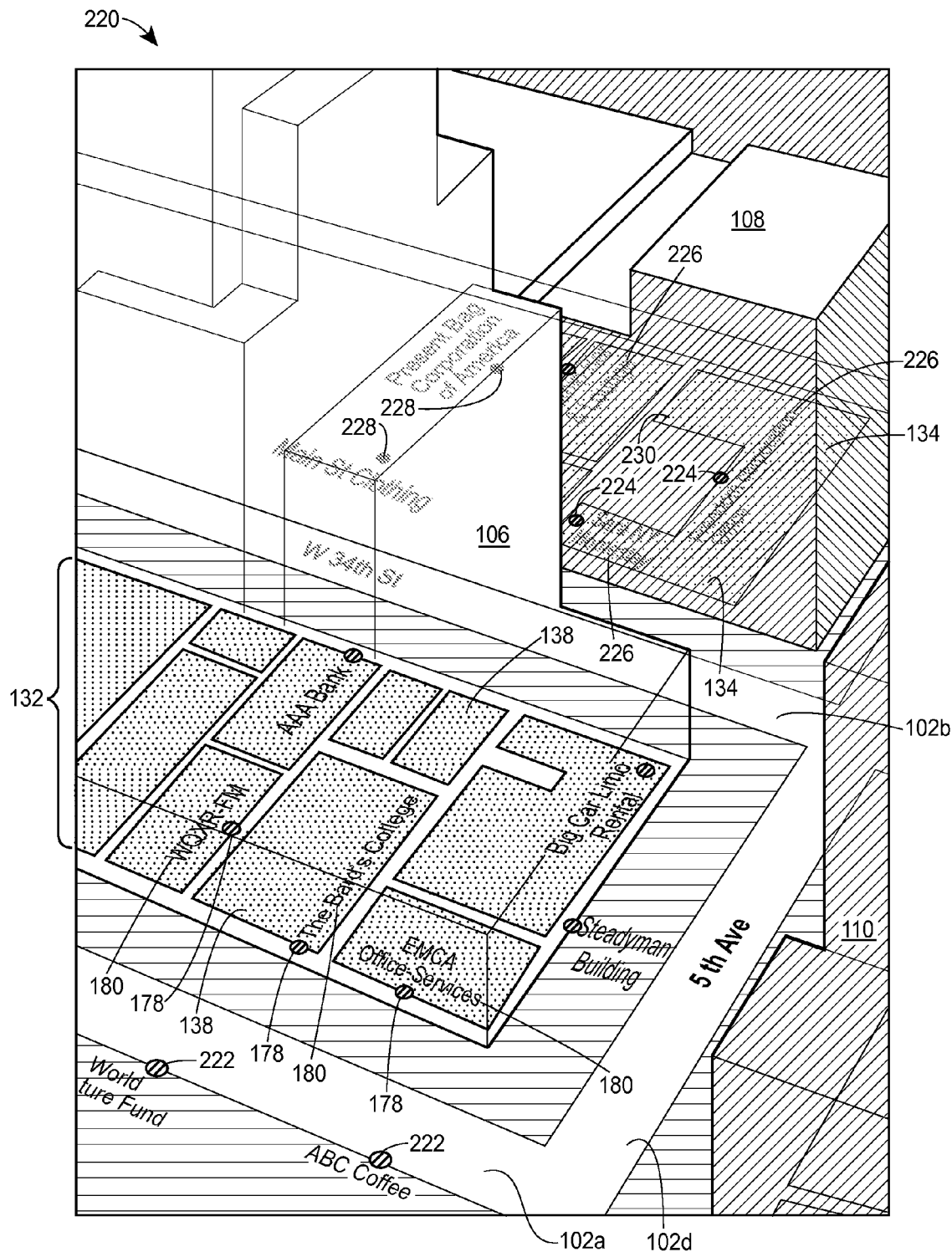

In a 3D map 210 depicted in FIG. 11, all of the buildings 106, 108 and 110 are transparent. Like FIG. 5, the street 102*b*, the building 108, and the floor plan 134 are visible through the semi-transparent building 106. However, in contrast to FIG. 5, the foreground floor plan 132 remains set on the lightened background 176, and the entrance icons 178 and labels 180 remain positioned and oriented within the floor plan 132 as in FIGS. 8-10.

The rules 49*b* may also specify other aspects of the rendering of 3D maps. For example, in FIG. 12, a 3D map 220 is depicted. In the 3D map 220, the entrance icons 178 are depicted with stroke and fill (as opposed to the solid dots in FIGS. 8-11). Additionally, the entrance icons are shown with perspective; entrance icons 222 in the foreground are larger than entrance icons 178 in the mid-ground, which are larger than entrance icons 224 in the background. Additionally, the stroke and fill of the entrance icons 178, 222, 224 and of the darkened areas 138 of the floor plans 132, 134 are rendered differently depending on the number and/or the type of surfaces between the apparent viewing position and the floor plan. For example, entrance icons and floor plans in the foreground (e.g., in the building 106) and/or obscured by no walls (e.g., the entrance icons 222) or by one wall (e.g., the entrance icons 178, the floor plan 132) appear with fill and stroke (i.e., shaded and outlined) on the lightened background 178.

Figure 13:
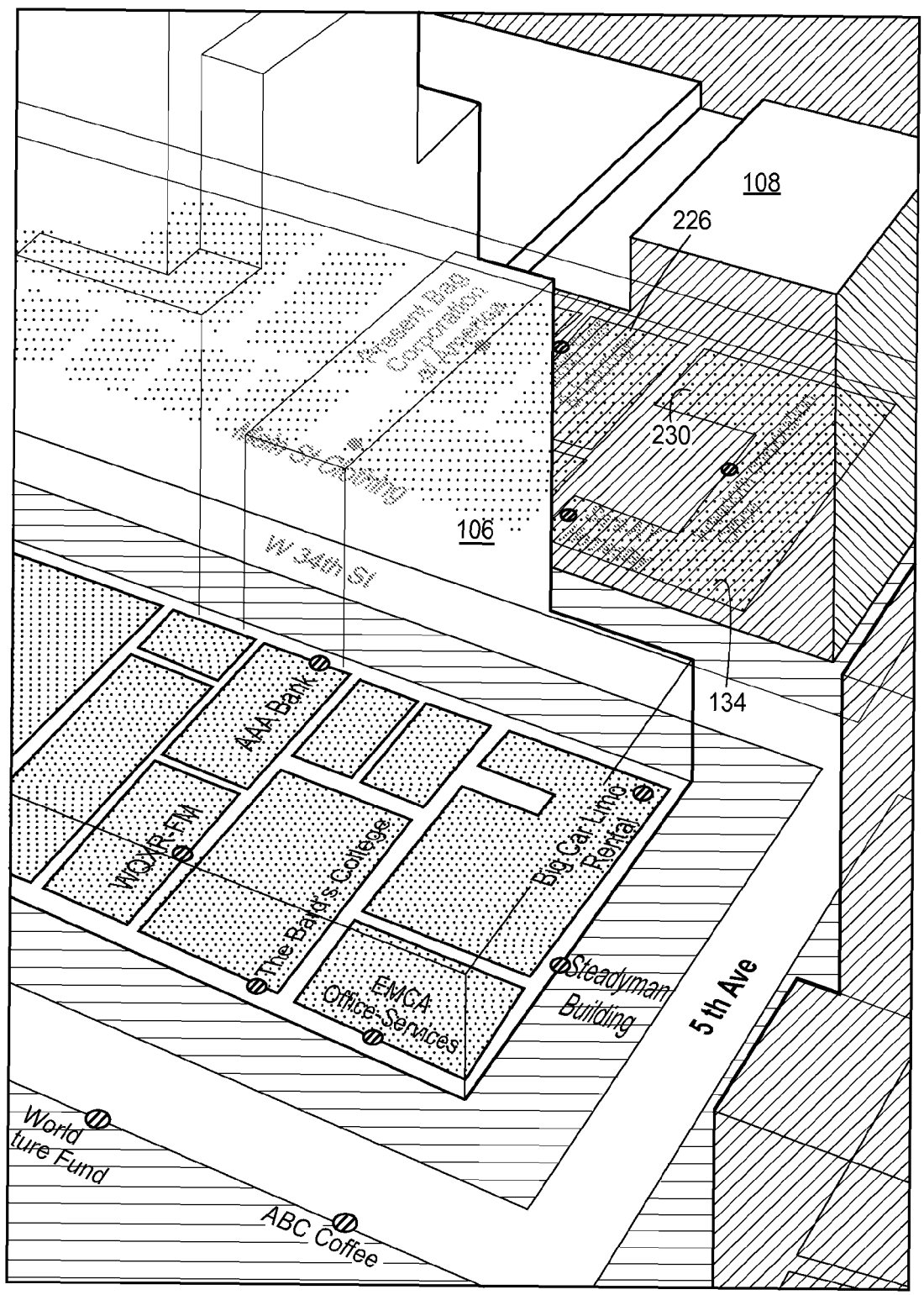

By contrast, entrance icons and floor plans in the background (e.g. within the building 108) may be rendered differently. The floor plan 134 within the background building is rendered without the lightened background 176. Darkened areas 230 of the floor plan 134 appear with fill and stroke, but the contrast is decreased. Likewise, entrance icons 224 are rendered with fill and stroke, but labels 226 corresponding to the entrance icons 224 are less opaque. Where the floor plan 134 is obscured both by the building 106 and by the wall of the building 108, the floor plan 134 is rendered differently still. The darkened areas 230 of the floor plan 134 no longer appear, and entrance icons 228 are rendered with fill only, and no stroke (i.e., they are not outlined). In FIG. 13, one of the rules 49*b* is modified relative to FIG. 12 such that the darkened areas 230 of the floor plan 134 appear even where the floor plan 134 is obscured both by the building 106 and by the wall of the building 108.

Figure 14:
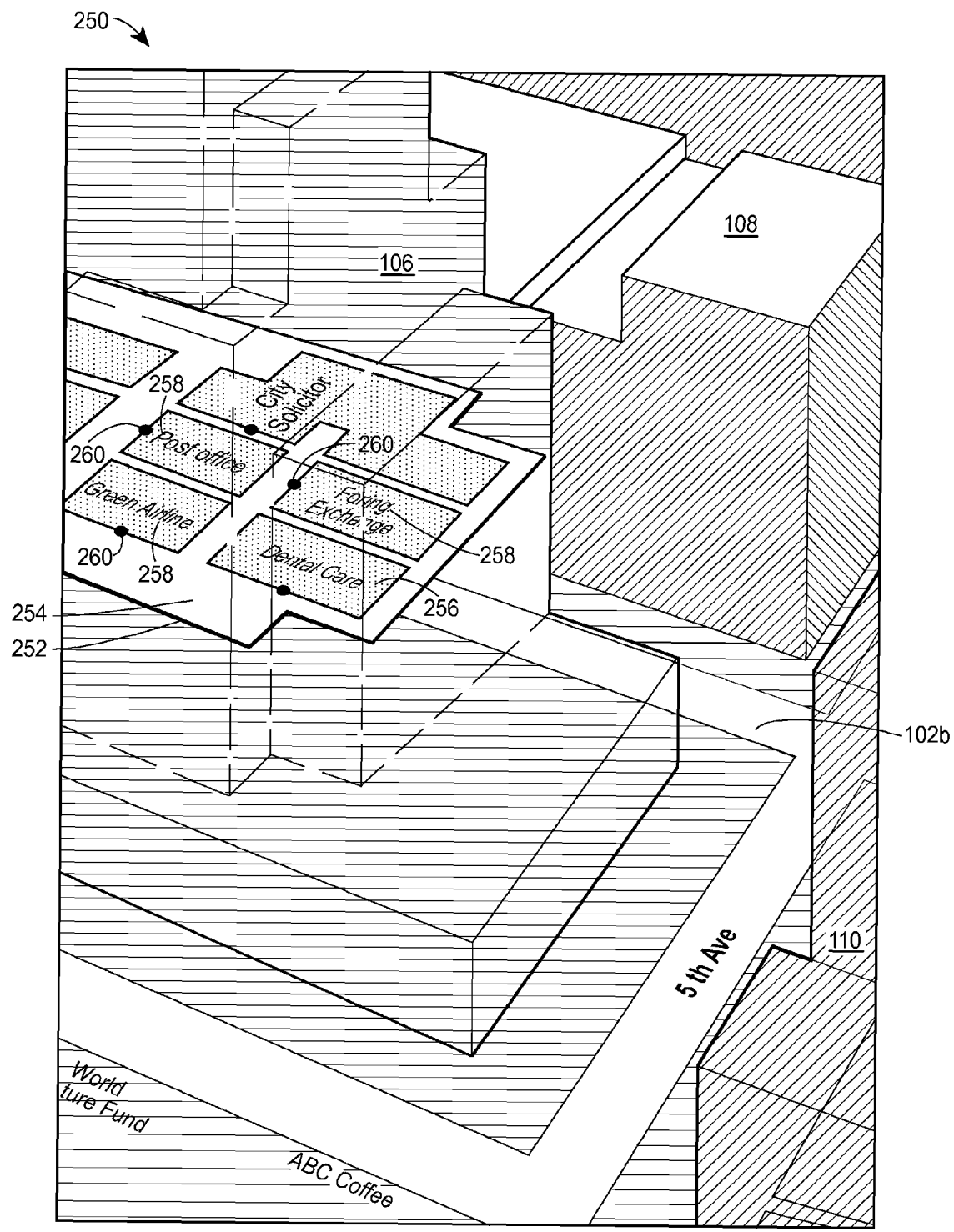

Still others of the rules 49*b* may relate to depicting floor plans of non-ground floors. In FIG. 14, a 3D map 250 depicts the same buildings 106, 108, 110. In the 3D map 250, the building 106 is transparent to content inside of the building 106, but opaque to content behind the building 106 (e.g., opaque to the building 108). The foreground shape of the building 106 is depicted with fill but no stroke, while the back and bottom edges of the building 106 are depicted with stroke. The building 108 is depicted with both stroke and fill, and is opaque to both content behind and inside of the building 108. A non-ground floor plan 252 shows the locations of entities on the depicted floor, while entities on other floors (e.g., the ground floor depicted in previous figures) are no longer shown. The floor plan 252 is rendered on a lightened background 254, with darkened areas 256 depicting the shapes and locations of the entities on the depicted floor. The darkened areas 256 are shown with both stroke and fill, and labels 258 and entrance icons 260 denote the name of each entity and the entrance location, respectively. The floor plan 252 is generally opaque to objects obscured by it, including, for example, the street 102*b*. Note that the floor plan 252 is irregularly shaped corresponding to the shape of the building 106 at the level of the floor depicted in the floor plan 252.

Figure 15:
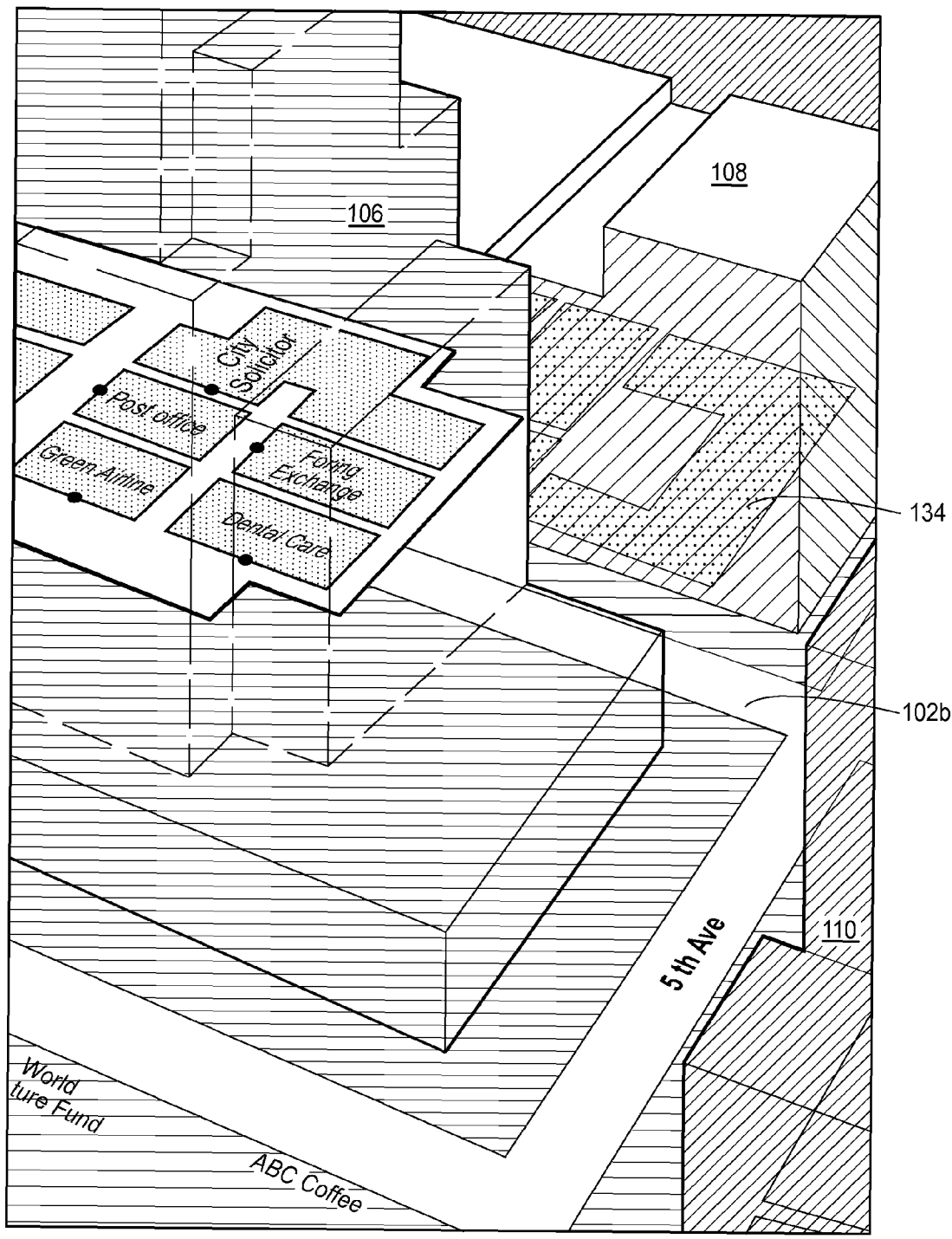
Figure 16:
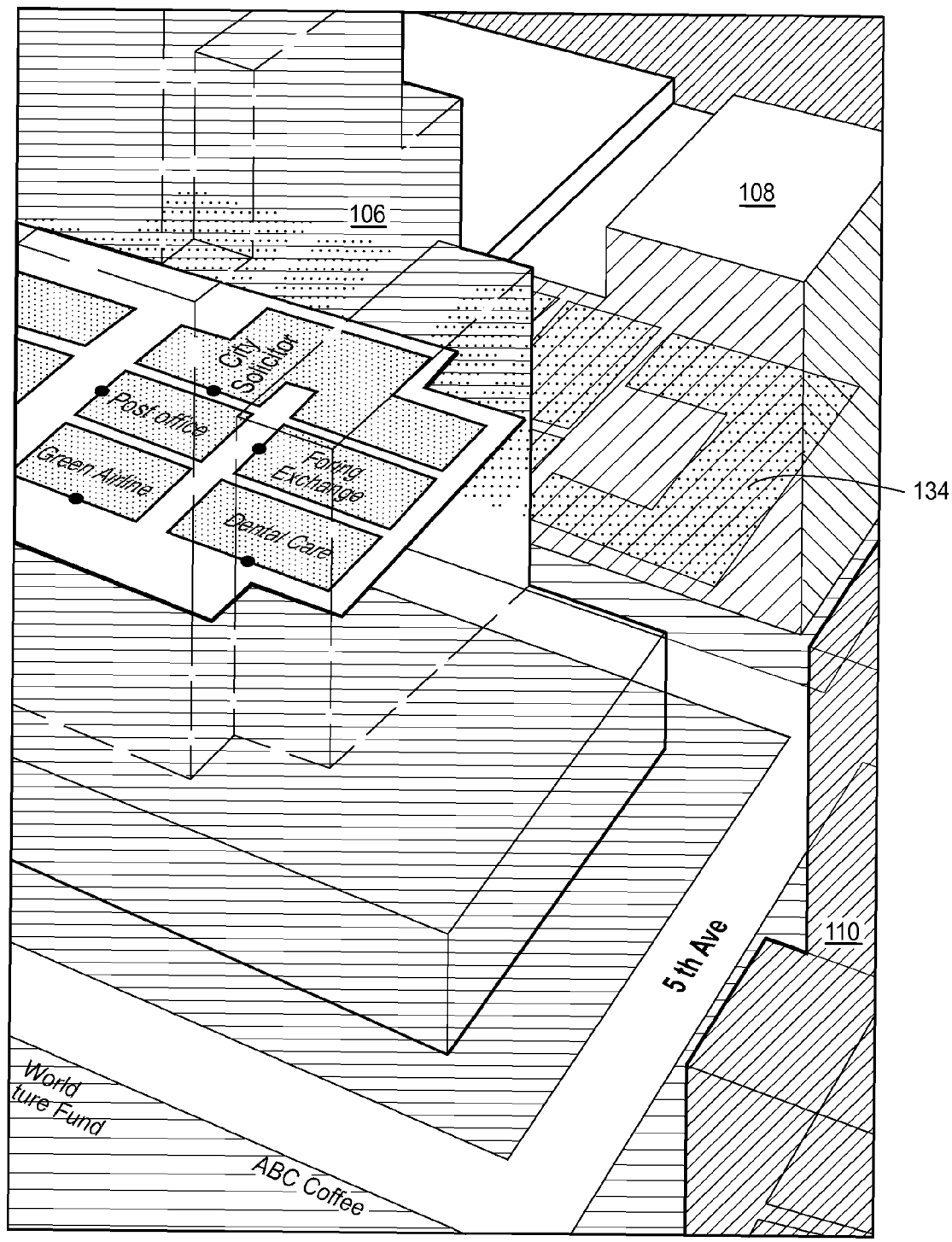

In FIG. 15, one of the rules 49*b* is modified relative to FIG. 14 such that the building 108 is transparent to inside content, allowing the floor plan 134 to be visible within the building 108 where it is not obscured by the building 106. In FIG. 16, one of the rules 49*b* is modified further still such that the floor plan 134 within the building 108 is visible even where it is obscured by the building 106. That is, the building 106 is transparent to the building 108, allowing inside content of the building 108 to be visible regardless of whether it is obscured by the building 106.

As the FIGS. 3-16 illustrate, the 3D maps depict a number of different map elements including, by way of example and not limitation, buildings, streets, floor plans, labels, icons, and the like. Other map elements may be depicted in implementations of 3D maps, including bodies of water, bridges, parks, landmarks, landscape, geography, public transit, etc., though these examples are illustrative and not exhaustive.

Each of the elements is endowed with various properties, which may be specified according to the object type, a rendering style based on one or more of the rules 49*b*, and/or the placement of the object in a particular 3D map viewport. The properties include whether the element is visible, whether it is rendered with stroke, whether it is rendered with fill, color, fading properties, and whether it is transparent and to what extent (0%, 100%, or somewhere in between). In some implementations, an element's transparency property may be specified specifically with regard to other elements. For example, a building may be transparent to some elements but opaque to other elements. The transparency property may be specified with regard to individual elements such as streets, buildings, floor plans, labels, icons, etc. or groups of elements such as internal elements, background elements, etc.

Figure 17:
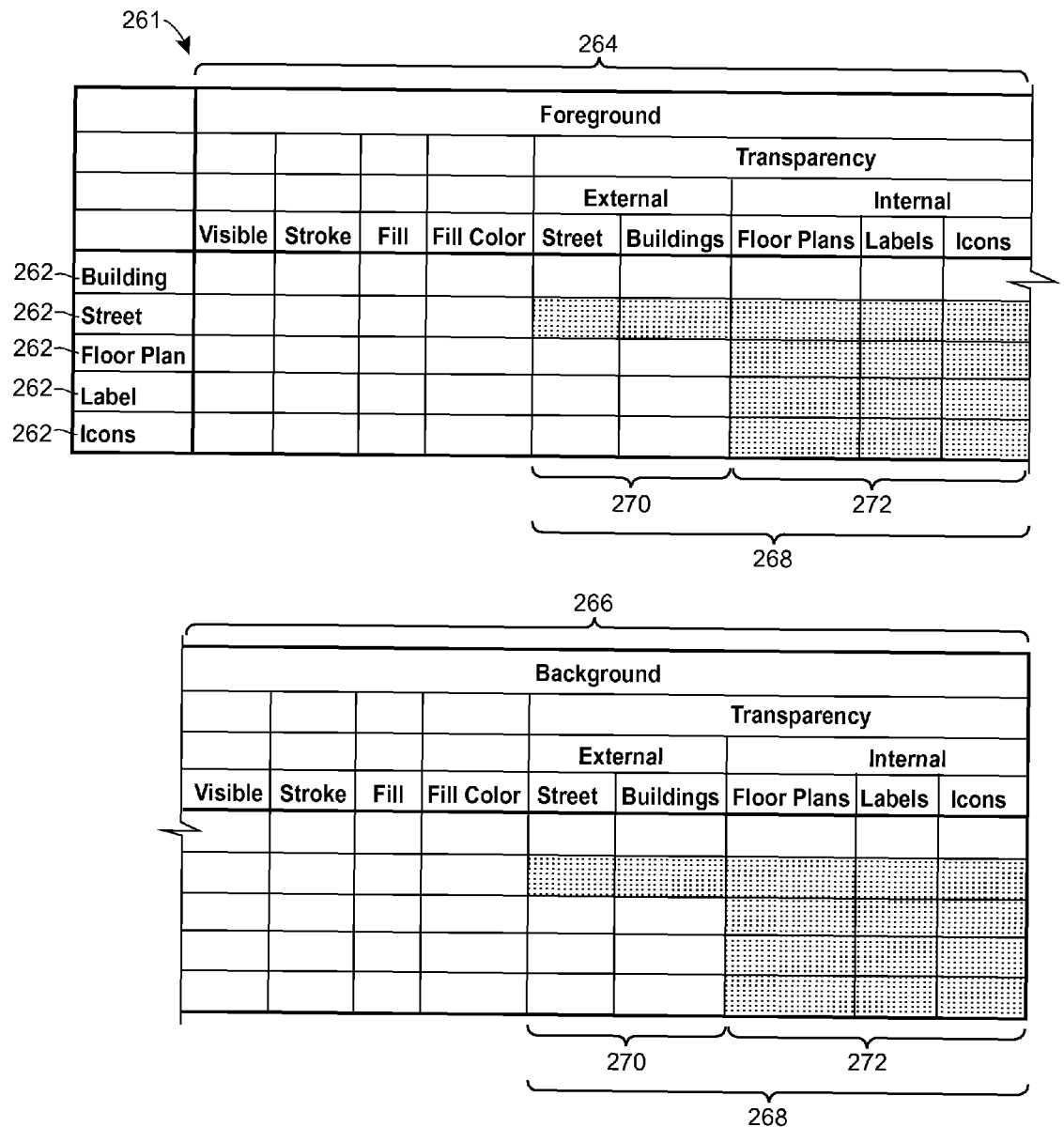
FIG. 17 is a chart illustrating the features of an exemplary data structure specifying rules for rendering a 3D scene in accordance with the description below.

In some implementations, the properties of each element type may be stored as rules 49b in a data structure on the memory 49 as a rendering style. FIG. 17 depicts a visualization, for the purposes of explanation, of a data structure 261, but is not intended to limit the precise type of data structure or arrangement of elements therein implemented by the system 10. In the visualization of FIG. 17, the data structure 261 includes a list of potential map elements 262. For each element 262, the data structure 261 includes a set 264 of foreground element properties (e.g., rules) specifying the rendering style of the element 262 if it appears in the foreground, and a set 266 of background element properties specifying the rendering style of the element 262 if it appears in the background. In the data structure 261, each of the foreground and background element property sets 264, 266 includes: the property "visible," specified as a binary value; the property "stroke," specified as a binary value; the property "fill," specified as a binary value; and the property "color," which may be specified in any way known in the art (e.g., as an RGB triplet). Each of the property sets 264, 266 also includes a set 268 of transparency properties, which may be further divided into transparency properties 270 related to elements external to the element 262 and transparency properties 272 related to elements internal to the element 262. The external properties 270 include: a "street" transparency and a "building" transparency, specifying, respectively, the degree to which streets and buildings can be seen through the element 262. The internal properties 272 include: a "floor plan" transparency, a "label" transparency, and an "icon" transparency specifying, respectively, the degree to which floor plans, labels, and icons can be seen through the element 262. All of the transparency properties 268 may be specified in any desired way including, by way of example, as real numbers indicating percentages (e.g., between 0 and 1, between 0 and 10, between 0 and 100, etc.) as desired.

Figure 18:
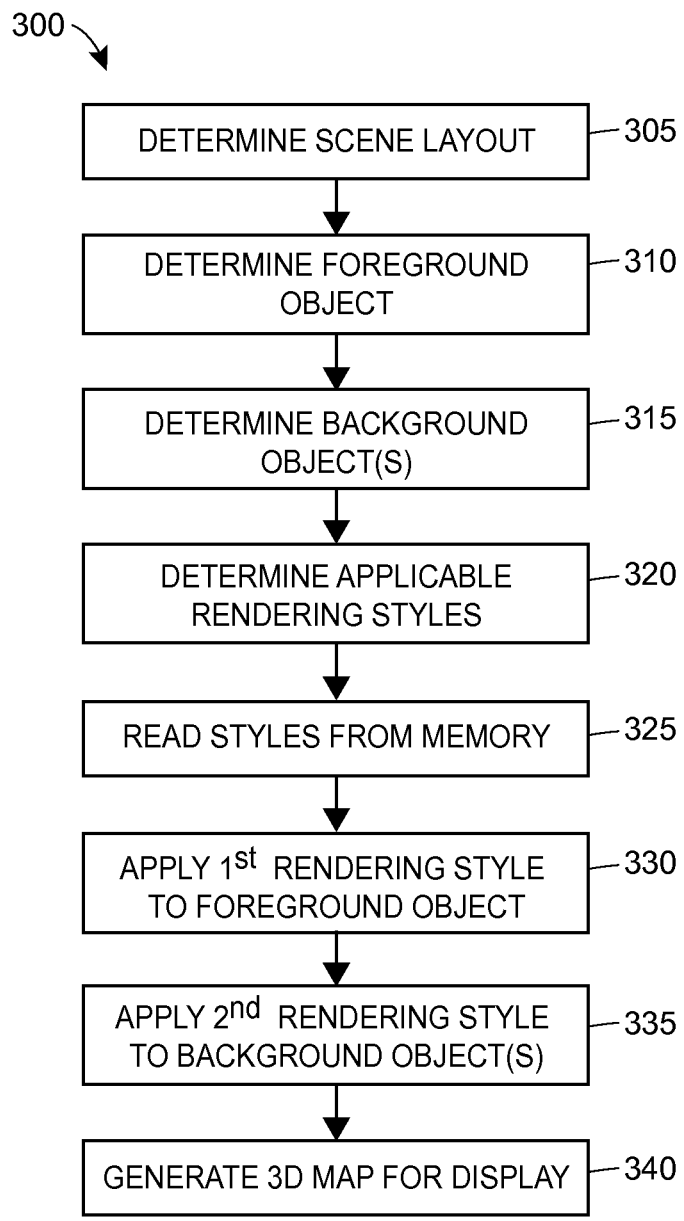
FIG. 18 is a flow chart depicting an exemplary method for implementing the visualization of obscured objects in 3D space.

Turning now to FIG. 18, a flow chart 300 depicts an exemplary method for implementing the visualization of obscured objects in 3D space and, in particular, for depicting a scene in a 3D view. The system 10 and, in particular, the processor 30 executing instructions stored on the memory 32 (or stored on another digital storage medium) first determines the layout of the scene to be depicted in the 3D view (block 305). This determination may be accomplished in any number of manners but, in general, includes the receipt of spatial data (e.g., vector data and or 3D mesh data related to the scene to be depicted) and, in many implementations, receipt of building model data. The processor 30 can determine from the data the spatial relationships of the elements in the scene, including streets, building locations, building heights, and the like, and can determine from the apparent viewpoint of the scene (which may be set or may be user selectable) how the elements would be placed in the scene relative to one another.

Figure 19:
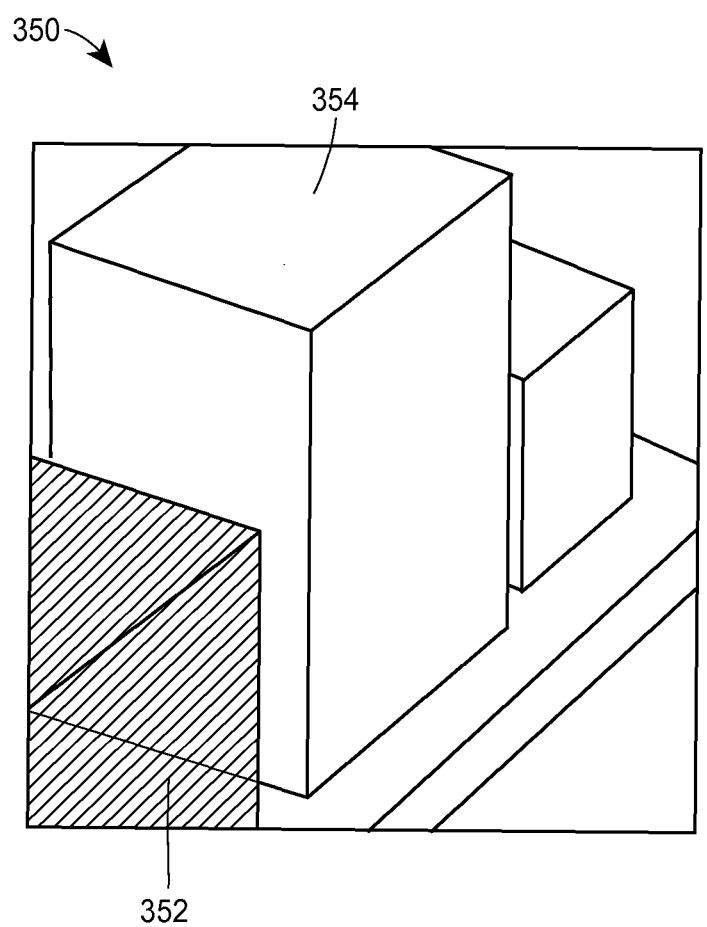
FIG. 19 depicts an exemplary scene in connect with the section of a foreground object in accordance with the description below.

Having determined the scene layout, the processor 30 determines a foreground object in the scene (block 310). In some implementations, the processor 30 determines a foreground object by detecting the position and height of an element in the scene relative to other elements in the scene. In other implementations, the processor 30 may determine a foreground object by determining and comparing the area of each element, and particularly of each building, that is visible in the scene. In some scenes, it is possible that, from the apparent viewpoint, one object dominates the scene and/or obscures many or all other elements in the scene, such as when the apparent viewpoint is right immediately "behind" a tall building. FIG. 19 depicts an example scene 350 in which the apparent viewpoint of the scene results in a building 352 in the extreme foreground obscuring a building 354 that is the user would like to view. In some implementations, the processor 30 may determine the foreground object by eliminating from the scene objects in the extreme foreground. Specifically, for example, if the object in the extreme foreground is a building, the processor 30 may determine whether the base of the building is visible in the scene and, if it is not, may render the object invisible so as to allow other objects (e.g., the building 354 in FIG. 19) to be visible in the scene. In other implementations, the processor 30 may be programmed to receive an input from the user (e.g., in the form of a mouse click or via a touch-sensitive display) as to the object that should be selected as the foreground object. In still other implementations, the processor 30 may be programmed to select as the foreground object an object associated with a search result (e.g., a building in which a business is located).

In any event, after determining and/or selecting a foreground object, the processor 30 determines objects in the background (block 315). This may include determining one or more elements that is "behind" the foreground object, whether obscured by the foreground object or not. Alternatively, the processor may analyze the coordinates of various elements in the scene and determine whether each object is in the background relative to the foreground object. It is possible that an object that is not the foreground object is nevertheless not in the background. For example, referring back to FIG. 5, the building 106 may be the foreground object. Each of the street 102b, the building 108, and the floor plan 134 may be background objects. The street 102a is not the foreground object, but is nevertheless not in the background.

The processor 30 also determines which rendering styles to the various elements in the scene (block 320). In some implementations, the styles to be applied to foreground and background elements are pre-determined and stored in the data memory 49. In other implementations, the styles to be applied to the foreground and background objects are determined according to the context in which the scene is being rendered for the user. For example, where the 3D map is being rendered in response to a search for a particular business located in the foreground building (e.g., the building 106), the style to be applied to the foreground building may include the display of a floor plan (e.g., the floor plan 132), while the foreground building is opaque to all elements in the background. In another example, where the 3D map is rendered in response to a search for a type of business (e.g., "restaurants") located in the vicinity of the foreground building, the style to be applied to the foreground building may render the foreground building transparent to both internal and external objects, so that both the floor plan 132 of the building 106 and the floor plan 134 of the building 108 may both be viewed with appropriate labels and icons denoting the locations of businesses therein. In still other implementations, the styles to be applied to the foreground and background objects are user selectable.

The processor 30 reads the style or styles (i.e., the appropriate set of rules 49b) from the memory 49 (block 325) according to the determination of the renderings styles to apply. The processor 30 applies a first rendering style to the foreground object (block 330) and a second rendering style to the background object(s) (block 335), and renders the scene to generate a 3D map for display on the display device 34 (block 340).

The received spatial, vector, and/or 3D mesh data related to the scene may be received from the server 14 and, specifically, from the data stored in the map database 12. In some implementations, one or more of the client devices 16-22 receives the data from the server 14 and the database 12, and the processor 30 on the client device 16-22 processes the data to determine the layout of the scene and to render the scene. In other implementations, the server 14 receives the data from the map database 12, completes the actions associated with one or more of the blocks 305-340, and transmits processed data to the client devices 16-22 for display.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only three clients 16-22 are illustrated in FIG. 1 to simplify and clarify the description, it is understood that any number of client computers are supported and can be in communication with the server 14.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system for displaying obscured objects in 3D space for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system for displaying obscured objects in 3D space through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of depicting on a display a three-dimensional (3D) map of a geographic region, the method executed by a computer processor executing instructions stored on a memory device, the method comprising:

obtaining, using the processor, a viewpoint for a 3D map of the geographic region;

identifying, using the processor, a foreground object in the 3D map based on the viewpoint;

identifying, using the processor, one or more background objects in the 3D map based on the viewpoint, each of the one or more background objects at least partially obscured by the foreground object or another background object;

applying, using the processor and using a set of rules, a first rendering style to the foreground object and a second rendering style to the one or more background objects, wherein the set of rules includes, for each of the foreground object and the background objects, one or more configurable foreground element properties specifying a rendering style of the object if the object is the foreground object and one or more configurable background element properties specifying the rendering style of the object if the object is one of the background objects, wherein the one or more foreground element properties and the one or more background element properties each include a first transparency parameter specifying a level of transparency for viewing an element internal to the object and a second transparency parameter specifying a level of transparency for viewing an element external to the object; and displaying, using the processor, the viewpoint for the 3D map including the foreground object rendered in the first rendering style and the one or more background objects rendered in the second rendering style.

2. The method of claim 1, wherein identifying a foreground object comprises determining the position and height of an element in the 3D map at the viewpoint relative to other elements in the 3D map at the viewpoint.

3. The method of claim 1, wherein the one or more foreground element properties and the one or more background element properties each include a stroke parameter specifying whether to include outline strokes depicting the outline of the object.

4. The method of claim 1, wherein a first background object is a background building and wherein the second rendering style includes the first transparency parameter specifying that the background building is transparent or semi-transparent for a second background object inside of the first background object except when obscured by the foreground object.

5. The method of claim 1, wherein the foreground object is a foreground building, and applying the first rendering style to the foreground object further includes rendering the foreground building to appear transparent with respect to an internal floor plan and opaque with respect to at least one of the one or more background objects.

6. The method of claim 5, wherein the level of transparency for viewing an element external to the foreground building increases from a bottom to a top of the foreground building.

7. The method of claim 1, wherein the first transparency parameter specifying a level of transparency for viewing an element internal to the object further includes at least one of: (i) a floor plan transparency parameter specifying a level of transparency for viewing a floor plan internal to the object, (ii) a label transparency parameter specifying a level of transparency for viewing a label internal to the object; or (iii) an icon transparency parameter specifying a level of transparency for viewing an icon internal to the object; and wherein the second transparency parameter specifying a level of transparency for viewing an element external to the object further includes at least one of: (i) a building transparency parameter specifying a level of transparency for viewing a building external to the object, or (ii) a street transparency parameter specifying a level of transparency for viewing a street external to the object.

8. A client device comprising:

a network interface;

a user interface;

one or more processors coupled to the network interface and the user interface; and a non-transitory computer-readable memory coupled to the one or more processors and storing thereon instructions that, when executed by the one or more processors, cause the client device to:

receive, via the network interface, map data related to a 3D map of a geographic region;

determine from the received map data a layout of the 3D map;

identify a foreground object in the 3D map from a plurality of elements in the 3D map;

identify one or more background objects in the 3D map from the plurality of elements in the 3D map, each of the one or more background objects at least partially obscured by the foreground object or another background object;

apply, using a set of rules, a first rendering style to the foreground object and a second rendering style to the one or more background objects, wherein the set of rules includes, for each of the foreground object and the background objects, one or more configurable foreground element properties specifying a rendering style of the object if the object is the foreground object and one or more configurable background element properties specifying the rendering style of the object if the object is one of the background objects, wherein the one or more foreground element properties and the one or more background element properties each include a first transparency parameter specifying a level of transparency for viewing an element internal to the object and a second transparency parameter specifying a level of transparency for viewing an element external to the object; and display, via the user interface, the 3D map including the foreground object rendered in the first rendering style and the one or more background objects rendered in the second rendering style.

9. The client device of claim 8, wherein to identify a foreground object, the instructions cause the client device to determine the position and height of an element in the scene relative to other elements in the scene.

10. The client device of claim 8, wherein the one or more foreground element properties and the one or more background element properties each include a stroke parameter specifying whether to include outline strokes depicting the outline of the object.

11. The client device of claim 8, wherein a first background object is a background building and wherein the second rendering style includes the first transparency parameter specifying that the background building is transparent or semi-transparent for a second background object inside of the first background object except when obscured by the foreground object.

12. The client device of claim 8, wherein the foreground object is a foreground building, and to apply the first rendering style to the foreground object, the instructions further cause the client device to render the foreground building to appear transparent with respect to an internal floor plan and opaque with respect to at least one of the one or more background objects.

13. The client device of claim 12, wherein the level of transparency for viewing an element external to the foreground building increases from a bottom to a top of the foreground building.

14. The client device of claim 8,
wherein the first transparency parameter specifying a level of transparency for viewing an element internal to the object further includes at least one of: (i) a floor plan transparency parameter specifying a level of transparency for viewing a floor plan internal to the object, (ii) a label transparency parameter specifying a level of transparency for viewing a label internal to the object; or (iii) an icon transparency parameter specifying a level of transparency for viewing an icon internal to the object; and wherein the second transparency parameter specifying a level of transparency for viewing an element external to the object further includes at least one of: (i) a building transparency parameter specifying a level of transparency for viewing a building external to the object, or (ii) a street transparency parameter specifying a level of transparency for viewing a street external to the object.

15. A non-transitory computer-readable storage medium storing instructions executable by a processor, the instructions causing the processor to:

receive map data related to a 3D map;

determine from the received data the visual relationships between a plurality of elements of a scene depicted in the 3D map;

determine, from the plurality of elements in the 3D map, a foreground building;

determine, from the plurality of elements in the 3D map, one or more background objects, each of the one or more background objects at least partially obscured by the foreground building, the one or more background objects selected from streets, buildings, labels, icons, and floor plans;

apply, using a set of rules, a first rendering style to the foreground building and a second rendering style to the one or more background objects, wherein the set of rules includes, for each of the foreground building and the background objects, one or more configurable foreground element properties specifying a rendering style of the object if the building or object is the foreground object and one or more configurable background element properties specifying the rendering style of the object if the building or object is one of the background objects, wherein the one or more foreground element properties and the one or more background element properties each include a first transparency parameter specifying a level of transparency for viewing an element internal to the object and a second transparency parameter specifying a level of transparency for viewing an element external to the object; and display the 3D map including the foreground building rendered in the first rendering style and the one or more background objects rendered in the second rendering style.

16. The computer-readable storage medium of claim 15, wherein to determine a foreground building, the instructions cause the processor to determine the position and height of a building in the scene relative to other elements in the scene.

17. The computer-readable storage medium of claim 15, wherein the one or more foreground element properties and the one or more background element properties each include a stroke parameter specifying whether to include outline strokes depicting the outline of the object.

18. The computer-readable storage medium of claim 15, wherein a first background object is a background building and wherein the second rendering style includes the first transparency parameter specifying that the background building is transparent or semi-transparent for a second background object inside of the first background object except when obscured by the foreground building.

19. The computer-readable storage medium of claim 15, wherein to apply the first rendering style to the foreground building, the instructions further cause the processor to render the foreground building to appear transparent with respect to an internal floor plan and opaque with respect to at least one of the one or more background objects.

20. The computer-readable storage medium of claim 15, wherein the level of transparency for viewing an element external to the foreground building increases from a bottom to a top of the foreground building.

* * * * *